June 19, 1945.  P. A. CARLBERG ET AL  2,378,464
METHOD OF TREATING A ROLLABLE MATERIAL TO PRODUCE SHEETS OR BANDS
HAVING LONGITUDINALLY DECREASING OR INCREASING THICKNESS
Filed Oct. 20, 1942
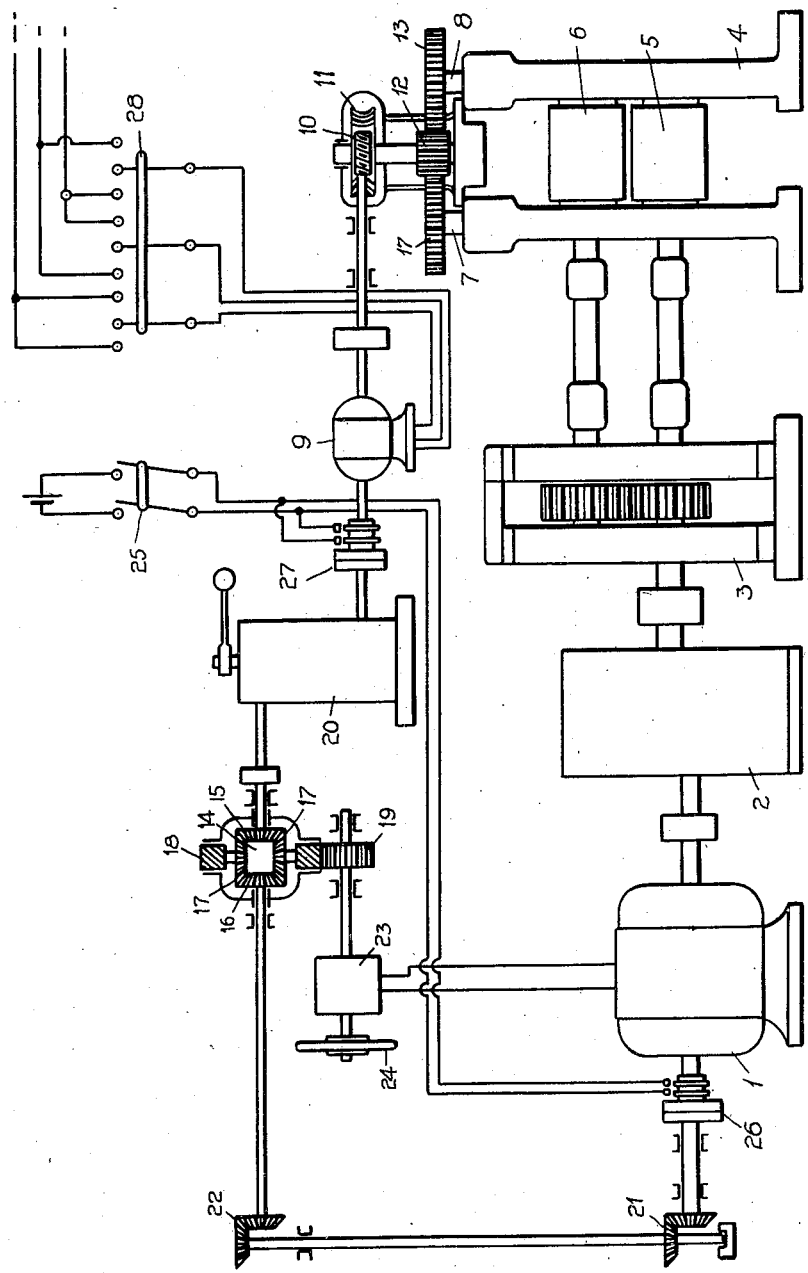
INVENTORS
Per Adolf Carlberg
Carl Gustaf Hård Af Segerstad
Stig Rye Ryhagen
BY
their ATTORNEY Patented June 19, 1945

2,378,464

UNITED STATES PATENT OFFICE 2,378,464

METHOD OF TREATING A ROLLABLE MATERIAL TO PRODUCE SHEETS OR BANDS HAVING LONGITUDINALLY DECREASING OR INCREASING THICKNESS

Per Adolf Carlberg, Carl Gustaf Hård af Segerstad, and Stig Rye Ryhagen, Sandviken, Sweden Application October 20, 1942, Serial No. 462,694
In Sweden August 9, 1941

3 Claims. (Cl. 80—60)

The present invention relates to a method of rolling strips, sheets and rod material tapered in the longitudinal direction.

An object of the invention is to provide an improved method according to which one and the same rolling mill may be used for the rolling of materials having different degrees of taper.

It has been proposed to roll materials having different degrees of taper by rotating the rollers of a rolling mill at a fixed speed while vertically displacing the adjusting spindles of the mill at a rate chosen according to the degree of taper required in each particular case. This known method necessitates the provision of special control means for adjusting the speed of the motor operating the adjusting spindles.

According to a feature of the present invention, the mutual distance between the cooperating rollers of the mill is changed at a predetermined constant rate while the speed of the rollers is adjusted in accordance with the degree of taper required in each particular case. By this method any special control means for the drive of the adjusting spindles may be dispensed with, and the desired result is obtained by utilizing the existing means for controlling the speed of the rollers.

A cold rolling mill embodying the invention is illustrated by way of example in the accompanying drawing.

I denotes the main drive motor of the rolling mill, 2 a reduction gear, 3 a pinion housing, and 4 the mill frame supporting two rollers 5 and 6. The lower roller 5 is journalled in fixed bearings, while the upper roller 6 is mounted in bearings which may be displaced in the vertical direction by means of threaded spindles 7, 8. The spindles are operated at a constant rate by a motor 9 through a reduction gear comprising the worm 10, the worm-wheel 11, the pinion 12 and the spur wheels 13. The speed of the main drive motor 1 is controlled by an electrical control device 23 which may be operated either by a hand-wheel 24 or by a spur wheel 19 engaging another spur wheel 18 which forms part of a differential gear 14. Said differential gear 14 comprises two solar wheels 15, 16 and two planet wheels 17 carried by the spur wheel 18. One solar wheel 15 is driven by the motor 9 through a change-speed gear 20, and the other solar wheel 16 is driven in the opposite direction by the main drive motor 1 through the bevel gears 21, 22. The described differential control unit may be put into or out of action by means of a switch 25 operating the magnetic clutches 26, 27. The motor 9 is controlled by a reversing switch 28.

The setting of the mill unit to a desired degree of taper is obtained by adjusting the speed of the main drive motor 1. Said adjustment may be effected either manually by means of the handwheel 24 or automatically by means of the differential gear unit 14. In the latter case, the change speed gear 20 is set to a gear ratio corresponding to the desired ratio between the speeds of the motors 1 and 9, and the switch 25 is thrown into operative position, so that the solar wheels 15, 16 are driven by the respective motors at speeds determined by the speeds of said motors and by the gear ratios of the gears 20, 21, 22. If the speeds of the solar wheels 15, 16 are not equal, the planet wheels 17 will rotate around the axis of the differential gear unit, thus producing a rotatory movement of the spur wheels 18 and 19. The movement of the spur wheel 19 produces a change of the setting of the control device 23 and, consequently, a change of the speed of the motor 1. As soon as the speed of the solar wheel 16 is equal to the speed of the solar wheel 15 the rotatory movement of the spur wheels 18, 19 will cease.

The construction of the differential gear unit 14 forms no part of the present invention, and it is obvious to anyone skilled in the art that said differential gear unit may be replaced by any other known device adapted to respond to a difference between the speeds of two axles, and that various known accessory devices may be used to ensure a smooth control of the speed of the motor 1.

In the operation of the mill unit shown, a blank in the shape of a strip or a sheet may be put several times through the mill, the speed of the main drive motor 1 during each passage being chosen according to a predetermined program. The screw drive motor 9 may be kept inoperative during part of the passage of the material through the mill. For well-known reasons it may be necessary to interpose one or more annealing operations between the rolling operations. To ensure uniform characteristics of the finished material throughout its length the successive reducing steps should be carried out in such a manner that the percent reduction during the rolling operations subsequent to the last of the annealing operations is equal throughout the length of the blank.

We claim:

1. In a method of treating a rollable material to produce sheets or bands of arbitrary length having longitudinally decreasing or increasing thickness, the step of continuously and automatically changing the mutual distance between the working rollers in dependence upon the thickness of the band leaving the roller while adjusting the latter's speed of rotation to accomplish the intended change of thickness per unit of length.

2. A method of rolling tapering strip, sheet or rod material in which the mutual distance of the cooperating rollers is changed at a predetermined constant rate and the speed of the rollers is adjusted in accordance with the degree of taper to be imparted to the material.

3. In a method according to claim 2, for the cold rolling of material in which one or more annealing operations are interposed between successive cold rolling operations, the step of adjusting the speed of the rollers during the rolling operation subsequent to the last of said annealing operations in such a manner that the percent reduction caused by said rolling operation is equal throughout the length of the blank.

PER ADOLF CARLBERG.
CARL GUSTAF HÅRD AF SEGERSTAD.
STIG RYE RYHAGEN.